(12) United States Patent
Kuwahara

(10) Patent No.: US 7,626,779 B2
(45) Date of Patent: Dec. 1, 2009

(54) DISK DRIVE IN WHICH DYNAMIC FLY HEIGHT OF HEAD IS ADJUSTED, AND METHOD OF ADJUSTING THE DYNAMIC FLY HEIGHT OF THE HEAD

(75) Inventor: Satoshi Kuwahara, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/143,018

(22) Filed: Jun. 20, 2008

(65) Prior Publication Data

US 2008/0316636 A1 Dec. 25, 2008

(30) Foreign Application Priority Data

Jun. 25, 2007 (JP) .............. 2007-166630

(51) Int. Cl.
*G11B 5/60* (2006.01)
*G11B 21/21* (2006.01)
(52) U.S. Cl. ...................... 360/75; 360/78.04
(58) Field of Classification Search ........ None
See application file for complete search history.

(56) References Cited

U.S. PATENT DOCUMENTS 7,027,242 B1 * 4/2006 Terrill et al. ............ 360/31
7,088,545 B1 * 8/2006 Singh et al. ............ 360/75
7,092,193 B1 * 8/2006 McKenzie et al. ......... 360/75
7,369,349 B2 * 5/2008 Satoh et al. ............ 360/75
7,385,777 B2 * 6/2008 Satoh et al. ............ 360/75
7,388,726 B1 * 6/2008 McKenzie et al. ......... 360/75
7,400,473 B1 * 7/2008 Krajnovich et al. ....... 360/294.7
7,426,089 B2 * 9/2008 Wada et al. ............ 360/75
7,483,234 B2 * 1/2009 Shimozato ............ 360/75

FOREIGN PATENT DOCUMENTS

| JP | 2653278 | 5/1997 |
| JP | 9-259556 | 10/1997 |
| JP | 2007-042239 | 2/2007 |
| WO | WO02-37480 | 10/2002 |

* cited by examiner

*Primary Examiner*—Hoa T Nguyen
*Assistant Examiner*—James L Habermehl
(74) *Attorney, Agent, or Firm*—Patterson & Sheridan, L.L.P.

(57) ABSTRACT

According to one embodiment, a disk drive includes a heating element which is provided on a head and generates heat when supplied with power, thereby to adjust a dynamic flying height of the head. A head-movement detecting unit detects the abnormal movement of the head, a value of which is larger than a preset movement value during a head positioning control. In this case, a heating-element controller stops supplying power to the heating element.

18 Claims, 4 Drawing Sheets

DISK DRIVE IN WHICH DYNAMIC FLY HEIGHT OF HEAD IS ADJUSTED, AND METHOD OF ADJUSTING THE DYNAMIC FLY HEIGHT OF THE HEAD

CROSS-REFERENCE TO RELATED APPLICATIONS

This application is based upon and claims the benefit of priority from Japanese Patent Application No. 2007-166630, filed Jun. 25, 2007, the entire contents of which are incorporated herein by reference.

BACKGROUND

1. Field

One embodiment of the present invention relates to a disk drive in which power is supplied to the heating element provided on the head, thereby changing the thermal expansion of the head to adjust the dynamic fly height of the head, and also to a method of adjusting the dynamic fly height of the head. More particularly, the invention relates to a disk drive in which the dynamic fly height of the head is well adjusted when the head undergoes an abnormal movement, and to a method of adjusting the dynamic fly height of the head in such an event.

2. Description of the Related Art

Hard disk drives (HDDs) are well known as representative examples of disk drives in which disks are used as recording media. Each HDD has a head (magnetic head) that is configured to write data in, and read data from, the disk (magnetic disk). The head flies above the disk as the disk is rotated.

For example, Jpn. Pat. Appln. KOKAI Publication No. 2007-042239 (hereinafter referred to as Prior Art Document 1) discloses an HDD in which a heating element (heater) is provided on the head (head slider). In the HDD disclosed in Prior Art Reference 1, the power supplied to the heating element is controlled, changing the thermal expansion (deformed amount) of the head. The distance between the head and the disk (more precisely, the surface of the disk), i.e., so-called dynamic fly height, is thereby adjusted. The heating element is called DFH heater, and the power supplied to the heating element is called DFH power.

For example, PCT International Publication No. 2002/037480 (hereinafter referred to as Prior Art Document 2) describes a technique of changing the voltage applied or current supplied to an electrically conductive film that is equivalent to the above-mentioned heating element, thereby adjusting the temperature of the head in order to adjust the thermal expansion of the head. Prior Art Document 2 also describes a technique of controlling the voltage applied or current supplied to the electrically conductive film (for example, not applying the voltage or supplying the current to the film), thereby to reduce the thermal expansion of the head while the head is being loaded or unloaded. The techniques disclosed in Prior Art Document 2 can prevent the head from colliding with the tiny projections existing on the disk surface, while the head is being loaded or unloaded.

The HDDs developed in recent years can record data in the disk at high density. The higher the recording density, the more the dynamic fly height of the head should be reduced. It is therefore important to use the techniques described in Prior Art Documents 1 and 2, thereby to adjust the dynamic fly height of the head. However, if the dynamic fly height of the head is small, or while the DFH power is being supplied to the heating element (hereinafter referred to as DFH-power ON state), a phenomenon may develop. That is, the head flies unstably in the DFH-power ON state, and will probably collide with the magnetic disk, causing a so-called head clash.

Assume that the head is moved to a target track on the disk and that a head positioning control (i.e., track following control) is then performed, thus positioning the head at a target position on the target track. If a small dynamic fly height is set for the head in the DFH-power ON state, the head may collide with the tiny projections existing on the disk surface. If the head collides with these projections, it will temporarily move in an unintended direction. If the head so moves, it will fly in an unstable manner. If the head flies unstably with its dynamic fly height set to a small value, a head clash will probably occur.

BRIEF DESCRIPTION OF THE SEVERAL VIEWS OF THE DRAWINGS

A general architecture that implements various features of the invention will now be described with reference to the drawings. The drawings and their associated descriptions are provided to illustrate the embodiments of the invention and not to limit the scope of the invention.

DETAILED DESCRIPTION

Various embodiments according to the invention will be described hereinafter with reference to the accompanying drawings. In general, according to one embodiment of the invention, a disk drive is provided. The disk drive comprises: a heating element which is provided on a head and is configured to generate heat when supplied with power, thereby to adjust a dynamic flying height of the head; a head-movement detecting unit which is configured to detect an abnormal movement of the head, a value of which is larger than a preset movement value during a head positioning control performed to settle the head at a target position on a disk; and a heating-element controller which is configured to stop a supply of power to the heating element when the abnormal movement of the head has been detected.

Figure 1:
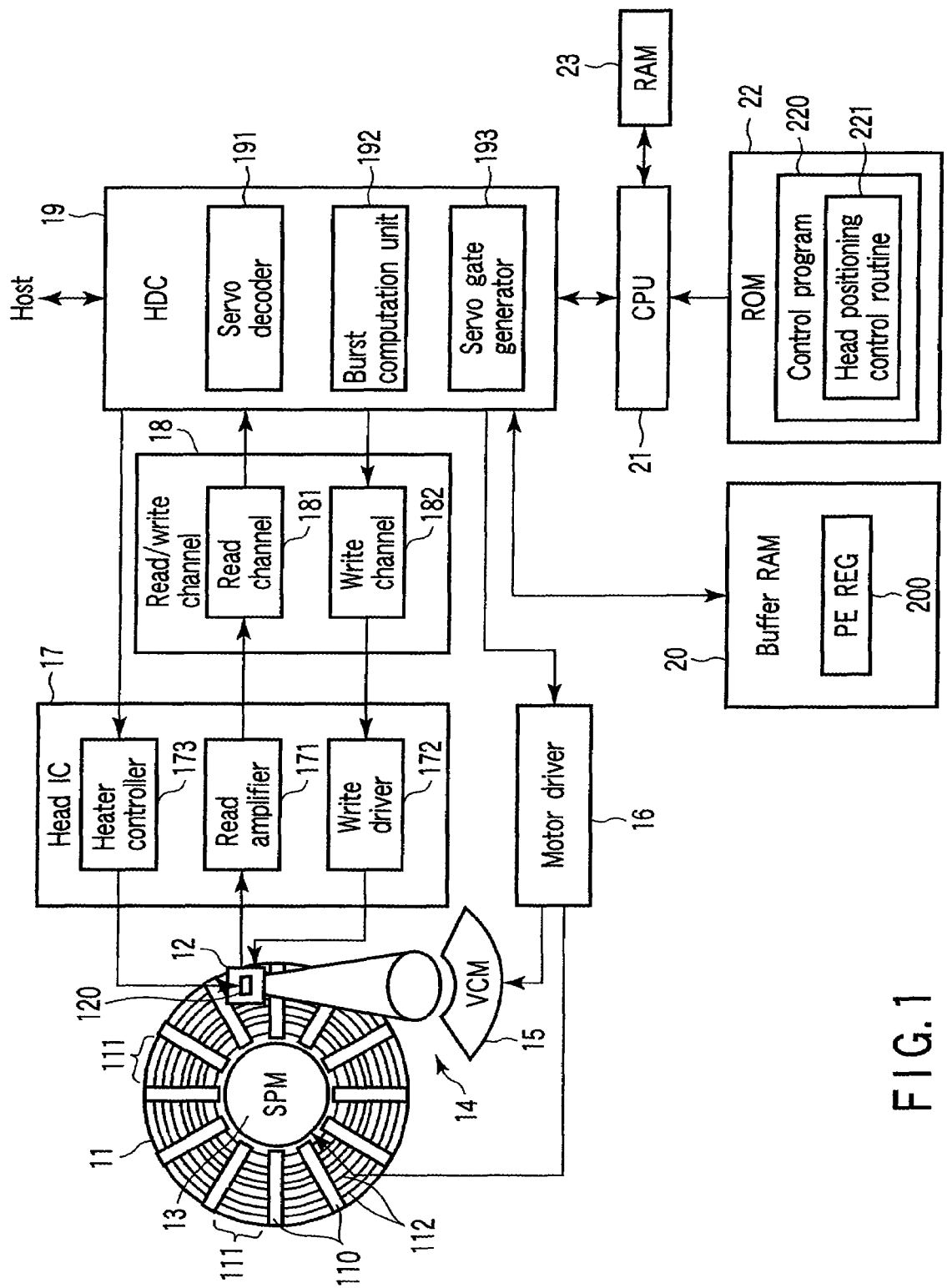
FIG. 1 is a block diagram showing an exemplary configuration of a hard disk drive according to an embodiment of the invention.

FIG. 1 is a block diagram showing an exemplary configuration of a hard disk drive (hereinafter referred to as HDD) according to an embodiment of the invention. As FIG. 1 shows, the disk (magnetic disk) 11 incorporated in the HDD has two disk surfaces, i.e., upper surface and lower surface. The upper surface, for example, of the disk 11 is a recording surface in which data can be magnetically recorded. A head (magnetic head) 12 is arranged, facing the recording surface of the disk 11. The head 12 is used to write data in, and read data from, the disk 11. The head 12 includes a write head (recording element) and a read head (reproducing element), which are not shown. The lower surface of the disk 11 is a recording surface, too. A head similar to the head 12 is arranged, facing this recording surface. The configuration shown in FIG. 1 is an HDD that has a single disk 11. Nonetheless, the HDD according to the embodiment may have a plurality of disks stuck one above another.

The head 12 has a heating element (DFH heater) 120 of such a type as described in Prior Art Document 1. The DFH heater 120 generates heat from the power (current) supplied to it. The heat generated by the DFH heater 120 expands a part of the head 12. The distance between the head 12 and the disk 11 (i.e., dynamic fly height of the head 12) is therefore adjusted.

On each recording surface of the disk 11, a plurality of servo areas 110 are provided, extending in radial direction of the disk 11 and equidistantly spaced apart in the circumferential direction of the disk 11. Concentric servo tracks 112 are arranged on either recording surface of the disk 11. In each servo area 110, servo data items for the respective servo tracks 112 are written (or embedded). In FIG. 1, the disk 11 is depicted as if having only 12 servo areas 110, for the sake of simplicity of illustration. In fact, however, the disk 11 has about 100 servo areas if the HDD is a 0.85-inch hard disk drive.

Figure 2:
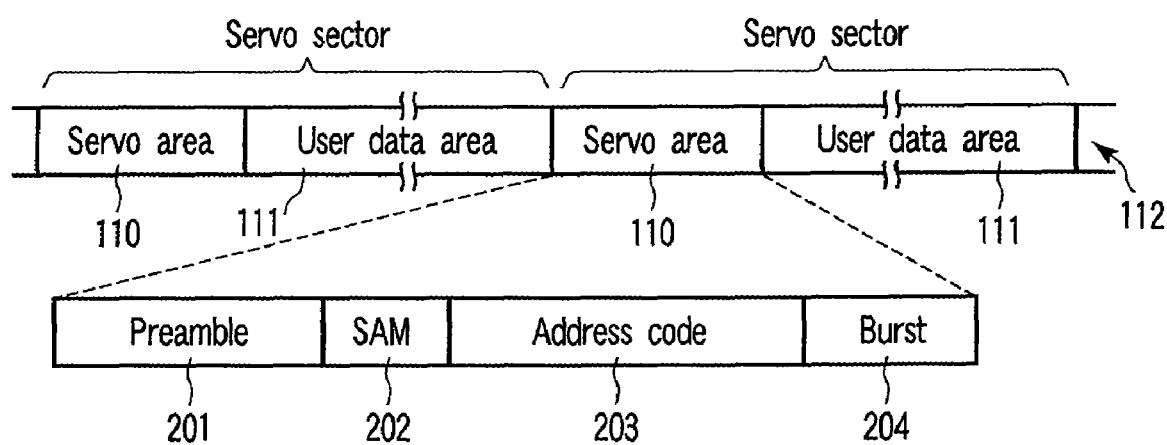
FIG. 2 is a diagram an exemplary format of a servo track and an exemplary format of servo data written in each servo area of the servo track, both formats being applied to the embodiment.

FIG. 2 is a diagram the format of each servo track 112, and the format of the servo data written in one of the identical servo areas 110 of the servo track 112. Each servo area 110 on the servo track 112 and the user data area that follows the servo area 110 constitute a servo sector. Each user area 111 consists of a plurality of data sectors.

The servo data written in each servo area 110 includes a preamble 201, a servo address mark (SAM) 202, an address code 203, and a burst data 204. The preamble 201 includes a signal of a prescribed frequency. The preamble is used in phase-lock loop (PLL) process and automatic gain control (AGC) process. The PLL process is performed to synchronize the clock signal for reproducing servo data (i.e., servo clock signal) with a time lag resulting from, for example, changes in the rotation speed of the disk 11. The AGC process is performed to stabilize the amplitudes of signals.

The servo address mark 202 is a specific code (pattern signal) that identifies the servo data (recorded in servo area 110) including the servo address mark 202. The address code 203 includes a cylinder address (cylinder number) and a sector address (sector number). The cylinder address represents the position of that cylinder (track) on the disk 11, in which the servo data including the cylinder address is written. The sector address represents the serial number of that servo area 110 on the same cylinder (track), in which the servo data including the sector address is written. The burst data 204 is a burst signal that represents the position the head takes relative to the cylinder in which the servo data including the bust data 204 is written. The address code 203 (more precisely, cylinder code) and the burst data 204 constitute position information that is used to locate the head 12 at a target position on the disk 11.

Referring to FIG. 1 again, the disk 11 is rotated at high speed by a spindle motor (SPM) 13. The head 12 is secured to the distal end of an actuator (carriage) 14. For the actuator 14, a voice coil motor (VCM) 15 is provided as driving source. When driven by the VCM 15, the actuator 14 moves the head 12 in a radial direction of the disk 11. The head 12 is thereby positioned at the target track. The SPM 13 and the VCM 15 are driven with drive currents (SPM current and VCM current) that are supplied from a motor driver (motor driver IC) 16. That is, the motor driver 16 includes an SPM driver (not shown) and a VCM driver (not shown) that drive the SPM 13 and the VCM 15, respectively.

The head 12 is connected to a head integrated circuit (head IC) 17. The head IC 17 is a single-chip IC that includes, for example, a read amplifier 171, a write driver 172, and a heater controller (heating element controller) 173. The head IC 17 further includes a resister (not shown) dedicated to holding power parameters, which will be described later. The read amplifier 171 amplifies a read signal output from the head 12 (more precisely, from the read head). The head driver 172 receives write data transferred from a read/write channel 18 (more precisely, from write channel 182), which will be described later. The head driver 172 converts the write data to a write current, which is output to the head 12 (more precisely, to the write head).

The heater controller 173 supplies the power (hereinafter called DFH power) designated by a CPU 21, which will be described later, to the DFH heater 120 that is included in the head 12. In this embodiment, the value of the DFH power the heater controller 173 supplies to the DFH heater 120 is designated by setting the parameter (DFH power parameter) in the dedicated resistor provided in the head IC 17. This parameter has supplied from the CPU 21 to the dedicated resistor via a hard disk controller (HDC) 19 and a serial interface. Hereinafter, the setting of any parameter (indicating DFH power other than 0) in the dedicated register will be referred to as DFH-power ON designation. Further, the operation of resetting the dedicated register, thereby designating "0" as DFH power value, will be referred to as DFH-power OFF designation. Thus, the heater controller 173 starts supplying the DFH power to the DFH heater 120 when the CPU 21 performs DFH-power ON designation in the dedicated register, and stops supplying he the DFH power to the DFH heater 120 when the CPU 21 performs DFH-power OFF in the dedicated register.

The head IC 17 is connected to the read/write channel 18. The read/write channel 18 is a signal-processing device that processes signals to read and write data. In this embodiment, the read/write channel 18 is a single-chip IC that includes a read channel 181 and a write channel 182.

The read channel 181 performs various types of signal processing. More precisely, the read channel 181 performs analog-to-digital (A/D) conversion, converting a read signal amplified in the head amplifier 171 of the head IC 17 to digital data. The read channel 181 performs servo detection, extracting the servo data from the digital data. The read channel 181 performs decoding process, decoding the digital data (read data). The read channel 181 transmits servo data extracted and read data decoded, to the disk controller 19, which will be described later. The write channel 182 performs a process, encoding write data.

The motor driver 16, the read/write channel 18, and the heater controller 173 of the head IC 17 are connected to the disk controller (HDC) 19. The HDC 19 is connected to a buffer RAM 20 and the CPU 21. Further, the HDC 19 is connected to a host (host system) and the CPU 21. The host is a digital device, such as a personal computer, which utilizes the HDD.

The HDC 19 has an interface control function to control reception of commands (e.g., write command and read command) transferred from the host and to control data transfers between the host and the HDC 19. The HDC 19 also has a disk control function to control data transfers between the disk 11 and the HDC 19 performed through the read/write channel 18. Further, the HDC 19 has an interface with the CPU 21.

The HDC 19 includes a servo decoder 191, a burst computation unit 192, and a servo gate generator 193. The servo decoder samples (latches) the servo data extracted via the write channel 182, by using a servo clock signal, and decodes the servo data thus sampled. The servo decoder 191 extracts a servo address mark 202, a cylinder address and sector address obtained from an address code 203, and a burst data 204, from the servo data by decoding.

The burst computation unit 192 computes a position error (head-position error) from the burst data 204 extracted by the servo decoder 191. The position error indicates the distance between the head 12 and the target position thereof. Further, the burst computation unit 192 computes a disparity between the cylinder address and the target address, the cylinder address having been extracted by the servo decoder 191. The disparity thus computed is notified to the CPU 21. The servo gate generator 193 asserts the servo gate (servo gate signal) that gives the timing of extracting the next servo data, according to the completion of the servo address mark 202 extracted by the servo decoder 191.

The buffer RAM 20 is a buffer memory composed of a RAM. A part of the storage area of the RAM 20 is used as position-error register (PE REG) 200. The position-error register 200 is a position-error holding unit which stores (holds) the position-error computed by the burst computation unit 192 of the HDC 19, as position error of the servo data sampled immediately before, until the servo decoder 191 samples the next servo data. Another part of the storage area of the buffer RAM 20 is used as a write buffer that temporarily holds the data to be written in the disk 11 by the HDC 19. Still another part of the storage area of the buffer RAM 20 is used as read buffer for temporarily holding the data (write data) that has been read from the disk 11 through the read/write channel 18.

A ROM 22 and a RAM 23 are connected to the CPU 21. The ROM 22 stores a control program (firmware) 220 that the CPU 21 should execute. The control program 220 includes a head-positioning control routine (track-following control routine) 221. The head-positioning control routine 221 includes a head-movement detecting process of detecting whether the head makes an abnormal movement during the head positioning control, as well as a head-positioning controlling process (so-called, on-track process). The head-positioning control routine 221 also includes a process of controlling the heater controller 173 in accordance with whether the head is making an abnormal movement, thereby to start or stop the supply of the DFH power. The RAM 23 provides a work area for the CPU 21. The CPU 21 executes the control program stored in the ROM 22, functioning as main controller in the HDD.

Figure 3:
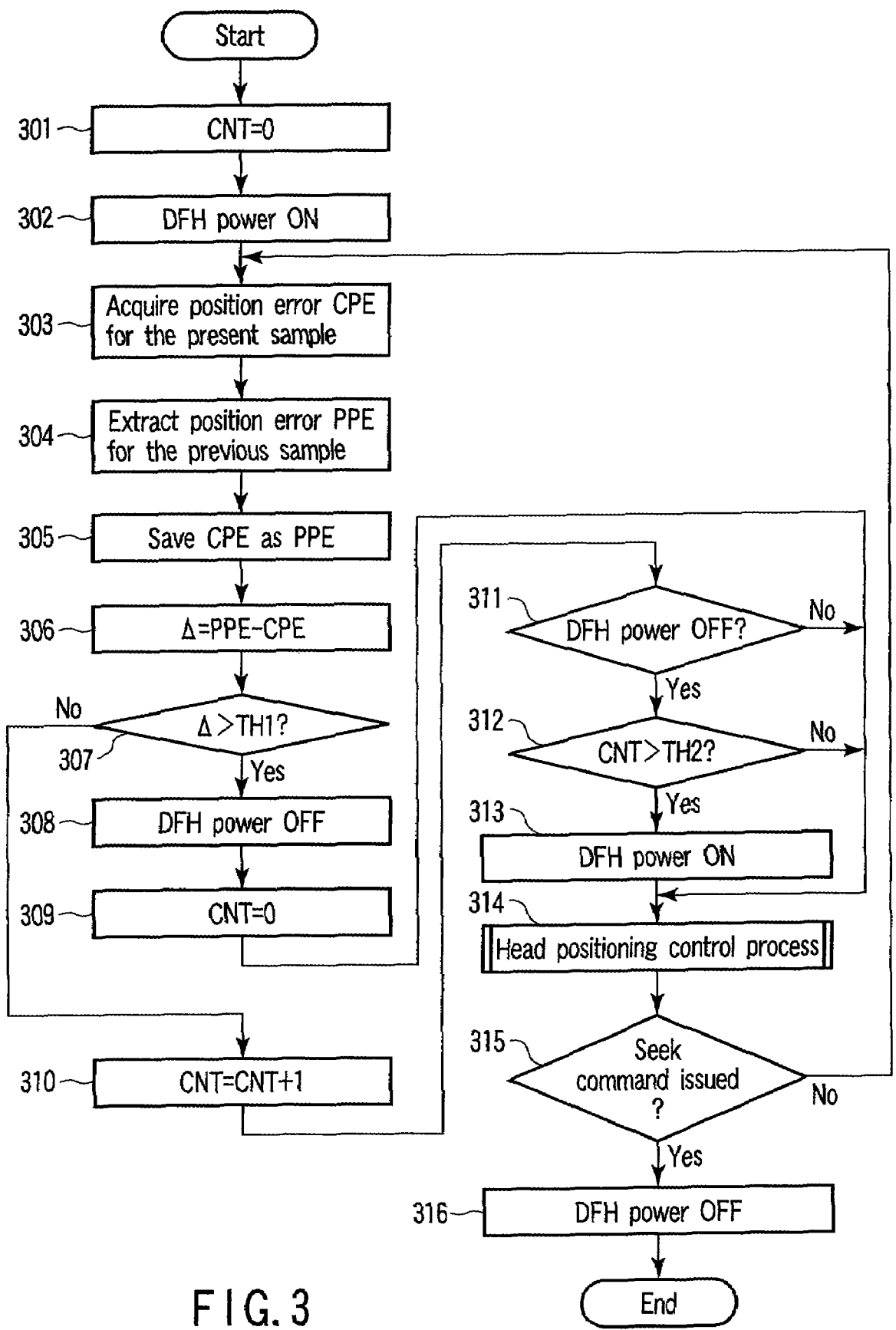
FIG. 3 is a flowchart showing the sequence of an exemplary process based on the head positioning control routine.

With reference to the flowchart of FIG. 3, it will be explained how a head positioning control is performed in this embodiment in order to settle the head 12 at a target position (a designated part of a target track). The head positioning control is performed as the CPU 21 executes the head positioning control routine that is contained in the control program 220.

Assume that the head 12 is being moved toward a target track on the disk 11 (that is, a seek operation is proceeding). At this point, the SPM 13 is rotating the disk 11 at high speed. The head 12 therefore flies above the disk 11, while moving over the disk 11. While the head 12 is being so moved (during the seek operation), no DFH power is supplied to the DFH heater 120, for the reason that will be described later. In other words, the DFH power is OFF during the seek operation.

Upon completion of the seek operation, a process is started on the basis of the head positioning control routine 221 that is contained in the control program 220. First, the CPU 21 initializes (clears) the count value CNT in a counter (not shown) and instructs the heater controller 173 to designate DFH-power ON (Blocks 301 and 302). So instructed, the heater controller 173 supplies DFH power to the DFH heater 120. That is, the heater controller 173 designates DFH-power ON.

In the present embodiment, the DFH power is not supplied during the seek operation before the head positioning control is started, even if the head 12 lies above the disk 11. When the head positioning control is started, the supply of DFH power is commenced. As a result, the DFH heater 120 starts generating heat, expanding (deforming) a part of the head 12. The dynamic fly height of the head 12 is therefore reduced. This enables the head 12 to write data in, and read data from, the disk 11 at high precision.

If the dynamic fly height of the head 12 remains small in the DFH-power ON state, however, the head 12 may collide with tiny projections such as contaminant, if any near the target position on the disk. If the head 12 collides with the projections, it will temporarily move in an unintended (unexpected) direction. Consequently, the flying state of the head 12 will become as unstable as during the seek operation. In this condition, a head clash may occur at high probability. In the present embodiment, the CPU 21 detects an abnormal movement that the head 12 undergoes during the head positioning control, in such sequence as will be described below, and performs a control to stop the supply of the DFH power upon detecting the abnormal movement of the head 12.

From the disk 11 being rotated by the SPM 14, the head 12 reads the data written in the disk 11. The data (read signal) the head 12 has read from the disk 11 is supplied to the head amplifier 171 incorporated in the head IC 17. The head amplifier 171 amplifies the read signal, which is supplied to the read channel 181 provided in the read/write channel 18. The read channel 181 converts the read signal to digital data. From the digital data, the read channel 181 extracts servo data items, one after another. The servo data items, thus extracted, are transmitted to the HDC 19, together with a servo clock signal.

The servo decoder 191 incorporated in the HDC 19 latches the servo data transmitted from the read channel 181, in synchronism with the servo clock signal. The servo decoder 191 then decodes the servo data. From the servo data latched, the servo decoder 191 extracts the servo address mark (SAM) 202, the cylinder address and sector address contained in the address code 203, and the burst data 204. The cylinder address and the burst data 204, thus extracted, are transmitted to the burst computation unit 192.

Every time burst data 204 is extracted during the head positioning control, the burst computation unit 192 computes a position error from the burst data 204. The data representing the position error computed is notified to the CPU 21.

The CPU 21 acquires the position error supplied from (or computed by) the burst computation unit 192, as present position error CPE (i.e., the position error pertaining to the present sample, which has been computed from the latest burst data sampled) (Block 303). From the position error register 200 provided in the present buffer RAM 20, the CPU 21 acquires the position error PPE (the position error pertaining to the previous sample) and computed from the burst data sampled previously (Block 304). At the same time, the CPU 21 saves the latest position error CPE acquired (i.e., the position error pertaining to the present sample), so that the latest position error CPE may be used in the next sampling, as position error PPE pertaining to the previous sample (Block 305). That is, the CPU 21 accomplishes FIFO control, in which the position error register 200 is used as a first-in, first-out (FIFO) buffer. The FIFO control may be performed in the HDC 19, independently of the control of the CPU 21.

Next, the CPU 21 operates as head-movement detecting unit, detecting the abnormal movement of the head 12 as will be explained below. First, the CPU 21 functions as a difference computation unit (subtracter), computing (calculating) the difference Δ between the position error PPE pertaining to the previous sample and read from the position error register 200 and the position error CPE pertaining to the present sample and acquired from the burst computation unit 192 (Block 306). The difference Δ, i.e., difference between the position error made at the previous sampling and the position error made at present sampling, is identical to the difference between the position the head 12 took at the previous sampling and the position the head 12 now takes at the present sampling. That is, the difference Δ indicates the distance (head-movement distance) the head 12 has moved during one-sampling period.

Then, the CPU 21 operates as comparing unit, comparing the difference (head-movement distance) Δ with a preset threshold value (preset head-movement distance) TH1, determining whether the difference (head-movement distance) Δ exceeds the threshold value TH1 (Block 307). If the difference Δ does not exceed the threshold value TH1 (if NO in Block 307), the CPU 21 determines that the head 12 has undergone no abnormal movement and that the HDD is in the normal state. In this case, the CPU 21 increments, by 1 (one), the count value CNT in the counter (Block 310). The count value CNT represents the number of times (i.e., number of samples) the HDD has been consecutively determined to be in the normal state.

Further, the CPU 21 determines whether the DFH power is OFF (Block 311). If the DFH power is OFF, the CPU 21 functions as head positioning control unit. That is, the CPU 21 performs head positioning control in accordance with the position error computed by the burst computation unit 192, thereby settling the head 12 at the target position (Block 314).

Subsequently, the CPU 21 functions as seek operation detecting unit, determining whether the host has issued a seek command to the head 12 to a new target position (target track) (Block 315). If the seek command has not been issued, the process returns to Block 303. At Block 303, the CPU 21 acquires the position error the burst computation unit 192 has computed for the next sample, as latest position error CPE (i.e., position error pertaining to the present sample).

Then, as in the case described above, the difference (head-movement distance) Δ between the position errors PPE and CPE pertaining to the previous sample and the present sample, respectively, is calculated (Block 306). The CPU 21 determines whether the difference (head-movement distance) Δ exceeds the threshold value TH1 (Block 307). If YES in Block 307, the CPU 21 determines that the head 12 has undergone an abnormal movement that may make the head 12 fly in an unstable state. The CPU 21 then instructs the heater controller 173 to designate DFH-power OFF and initializes the count value of the counter to be zero (Blocks 308 and 309). So instructed, the heater controller 173 stops supplying DFH power to the DFH heater 120.

Thus, in the present embodiment, the CPU 21 determines (detects) that the head 12 has made an abnormal movement, if the head 12 is found to have moved a distance Δ greater than the threshold value TH1 between the previous sampling and the present sampling, even if the head positioning control is proceeding in normal manner. The moment this abnormal movement of the head 12 is detected, the supply of DFH power is stopped. As a result, the thermal expansion of the head 12 decreases, increasing the dynamic fly height of the head 12. This reduces the possibility of head clash or damage to the disk 11 even if the flying state of the head 12 has become unstable due to an abnormal movement of the head 12. If the supply of DFH power has already been stopped, the CPU 21 need not give an instruction for the DFH-power OFF to the heater controller 173 by all means. If the CPU 21 determines that the difference (head-movement distance) Δ exceeds the threshold value TH1 (Block 307), it performs Blocks 308 and 309. Then, the head positioning control is continued (Block 314).

If the difference (head-movement distance) Δ does not exceed the threshold value TH1 (NO in Block 307), the CPU 21 functions as head-movement dissolution detecting unit, determining whether the abnormal movement of the head 12 has been dissolved, as will be explained below. First, the CPU 21 increments, by 1 (one), the count value CNT in the counter as described above (Block 310). Next, the CPU 21 determines whether the supply of DFH power has been stopped (Block 311).

If the supply of DFH power has been stopped (YES in Block 311), the CPU 21 functions as comparing unit, comparing the count value CNT in the counter with a preset threshold value (preset number of samples) TH2. Thus, the CPU 21 determines whether the count value CNT has exceeded the threshold value TH2 (Block 312). If the count value CNT has not exceeded the threshold value TH2 (NO in Block 312), the CPU 21 determines that the abnormal movement of the head has not been dissolved. In this case, the head positioning control is continued, while the DFH power remains OFF (Block 314).

Assume that the value CNT eventually exceeds the threshold value TH2 (YES in Block 312). Then, the difference (head-movement distance) Δ is found not to have exceeded the thresh value TH1 for more consecutive samples than indicated by the threshold value TH2, throughout the period for which the DFH power is OFF. In this is the case, the CPU 21 detects (determines) that the abnormal movement of the head has been dissolved and instructs the heater controller 173 to start supplying the DFH power to the DFH heater 120 again. Thus, the CPU 21 continues the head positioning control (Block 314).

Thereafter, the host may issue a seek command (Block 315). In response to the seek command, the CPU 21 instructs the heater controller 173 to stop supplying the DFH power (Block 316). The CPU 21 then finishes executing the head positioning control routine 221. The seek operation is thereby performed in the HDD, while no DFH power is being supplied to the HDD.

Thus, in the present embodiment, the DFH power is OFF during the seek operation. The dynamic fly height of the head 12 remains higher during the seek operation than during the period in which the DFH power remains ON. The head 12 is thereby moved to the target track, reducing the possibility of a head clash, though the head 12 is likely to fly in an unstable state.

The head 12 tends to fly in an unstable state if the HDD receives an impact from outside or if the rotation speed of the disk 11 changes. Even if the HDD receives an impact from outside or the rotation speed of the disk 11 changes, the possibility of head clash can be minimized by setting the DFH power OFF. The factor of destabilizing flying state of the head 12 can be easily detected by techniques known in the art. The impact externally applied, for example, can be detected by using a shock sensor. The change of the rotation speed of the disk 11, for example, can be detected by monitoring the rotation speed of the SPM that rotates the disk 11.

[Modification]

A modification of the above embodiment will be explained. This modification is characterized in that hardware is used, detecting an abnormal movement of the head, if any, during the head positioning control, and dissolving the abnormal movement of the head.

Figure 4:
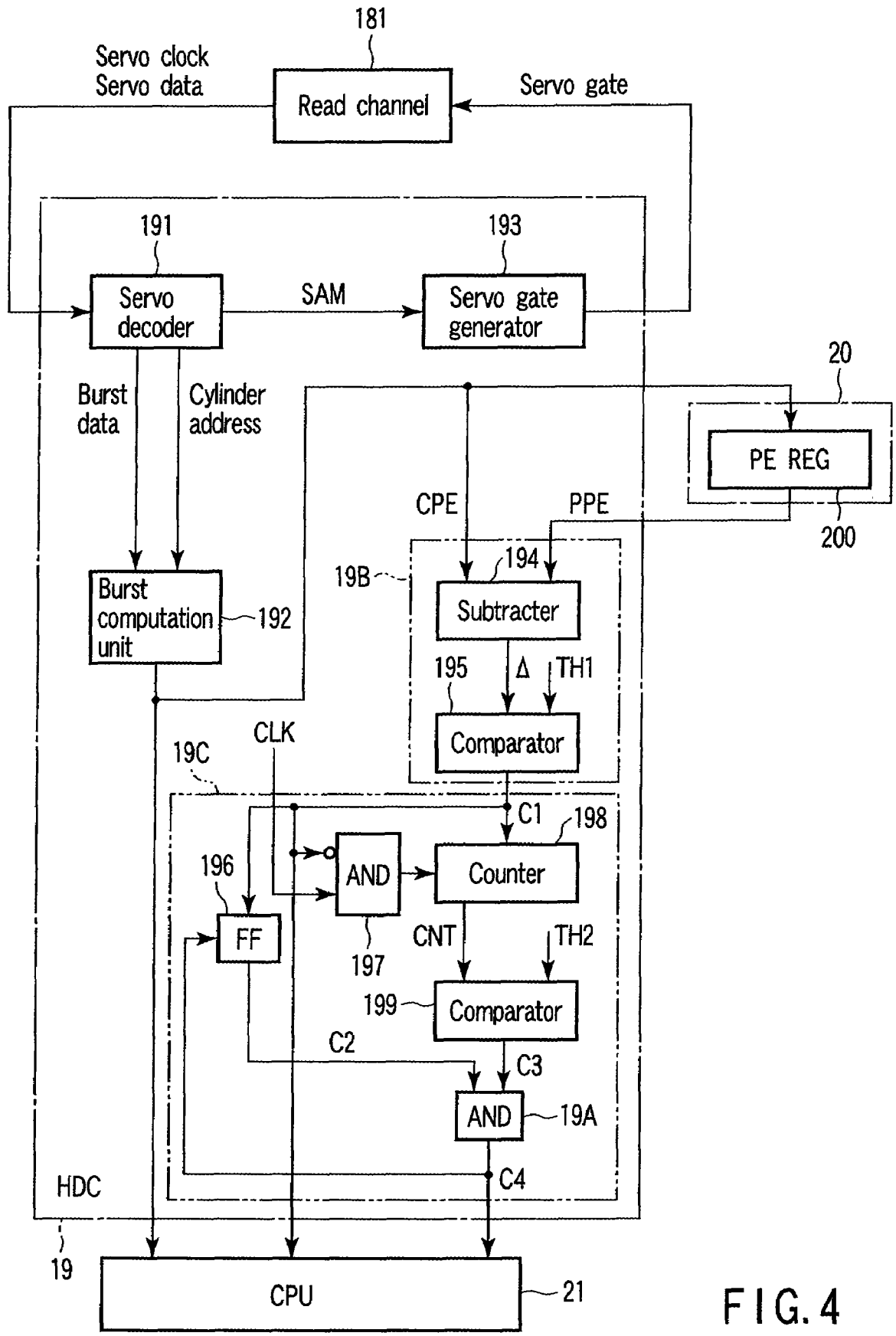
FIG. 4 is a block diagram showing an exemplary hardware configuration mainly concerning with the disk controller used in a modification of the embodiment.

FIG. 4 relates to a modification of the embodiment according to the invention, showing mainly the hardware configuration of the HDC 19. In FIG. 4, the components identical to those shown in FIG. 1 are designated by the same reference numerals. As FIG. 4 shows, the HDC 19 includes a subtracter (subtracting unit) 194, a comparator (comparing unit) 195, flip-flop (FF) 196, an AND gate (AND) 197, a counter 198, a comparator (comparing unit) 199, and an AND gate (AND) 19A, in addition to the servo decoder 191, burst computation unit 192 and servo gate generator 193 that are shown in FIG. 1. The subtracter 194, comparator 195, flip-flop 196, AND gate 197, counter 198, comparator 199 and AND gate 19A are configured to operate during the head positioning control only.

The subtracter 194 and comparator 195 constitute a head-movement detecting unit 19B that detects that the distance Δ the head 12 has moved, which is longer than the thresh value TH1. The subtracter 194 finds the difference Δ between the position error PPE pertaining to the previous sample and held in the position error register 200 provided in the buffer RAM 20 and the position error CPE pertaining to the present sample and computed by the burst computation unit 192. The difference Δ represents the distance the head 12 has moved (head-movement distance). In the present embodiment, the position error PPE is output from the position error register 200 when the position error CPE pertaining to the present sample extracted is held in the position error register 200 as position error PPE that will be applied to the next sample.

The comparator 195 compares the difference (head-movement distance) Δ calculated by the subtracter 194, with the threshold value TH1. The comparator 195 outputs a signal C1 representing the result of the comparison. More specifically, the comparator 195 outputs a high-level signal C1 if the difference Δ is greater than the threshold value TH1. The high-level signal C1 indicates that the supply of the DFH power should be stopped because the head 12 has made an abnormal movement during the head positioning control. The difference Δ may be equal to or smaller than the threshold value TH1. In this case, the comparator 195 outputs a low-level signal C1.

If the comparator 195 outputs a high-level signal C1, the CPU 21 instructs the heater controller 173 to stop supplying the DFH power, in synchronism with a sample clock signal CLK. The sample clock signal CLK indicates the timing at which the servo decoder 191 extracts the servo address mark (SAM) 202. An AND gate may be used, which allows the outputting of the signal CLK for only the time the signal C1 stays at high level. The output signal of this AND gate may be used as signal that causes the heater controller 173 to stop supplying the DFH power.

The flip-flop 196, AND gate 197, counter 198, comparator 199 and AND gate 19A constitute a head-movement dissolution detecting unit 19C that detects (determine) that the abnormal movement of the head 12 has been dissolved. The flip-flop 196 is a state-holding circuit that is set when the level of the signal C1 changes to high level. While the flip-flop 196 remains set, the DFH power is OFF. The flip-flop 196 remains so until the AND gate 19A outputs a high-level signal C4. The flip-flop 196 outputs a signal C2 that indicates its state (set/reset state).

The signal C1 output from the comparator 195 is input to the AND gate 197. The AND gate 197 receives a sample clock signal CLK, too. The AND gate 197 outputs the sample clock signal CLK to the clock input terminal of the counter 198, only for the period the signal C1 stays at low level. While the signal C1 remains at low level, the count in the counter 198 is incremented in synchronism with the sample clock signal CLK. In other words, the counter 198 counts the samples sequentially detected while the difference Δ remains equal to or smaller than the threshold value TH1 (remains in the normal state). The counter 198 is reset when the level of the signal C1 changes to high level.

The comparator 199 compares the count CNT in the counter 198 with the threshold value TH2 and generates a signal C3 representing the result of the comparison. More precisely, the comparator 199 outputs a high-level signal C3 if the count CNT is larger than the threshold value TH2. The high-level signal C3 shows that the difference Δ remains equal to or smaller than the threshold value TH1 (remains in the normal state) for more consecutive samples than the number indicated by the threshold value TH2.

The signal C3 output from the comparator 199 is input to the AND gate 19A. The AND gate 19A also receives the signal C2 that indicates the state of the flip-flop 196. The AND gate 19A outputs a high-level signal C4 that is at high level only while both the signal C2 and the signal C3 stay at high level. The high-level signal C4 shows that while the DFH power is OFF, the HDD stays in normal state, or the difference (head-movement distance) Δ has not exceeded the threshold value TH1 (remains in the normal state), for more consecutive samples than the number indicated by the threshold value TH2.

If the AND gate 19A outputs a high-level signal C4, the CPU 21 instructs the heater controller 173 to start supplying the DFH power to the DFH heater 120 in synchronism with the sample clock signal CLK. In addition to the signals C2 and C3, the signal CLK may be input to the AND gate 19A. In this case, the output signal C4 of the AND gate 19A is supplied to the heater controller 173, instructing that the DFH power should be ON.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from spirit of the inventions. The accompanying claims and their equivalents are intended to cover such forms or modifications as would fall within the scope and spirit of the inventions.

What is claimed is:

1. A disk drive comprising:
    a heating element which is provided on a head and is configured to generate heat when supplied with power, thereby to adjust a dynamic flying height of the head;
    a head-movement detecting unit which is configured to detect an abnormal movement of the head, a value of which is larger than a preset movement value during a head positioning control performed to settle the head at a target position on a disk; and
    a heating-element controller which is configured to stop a supply of power to the heating element when the abnormal movement of the head has been detected.

2. The disk drive of claim 1, further comprising a head-movement dissolution detecting unit which is configured to detect that the abnormal movement of the head has been dissolved.

3. The disk drive of claim 2, wherein the heating-element controller is configured to start supplying power to the heating element again when the head-movement dissolution detecting unit detects that the abnormal movement of the head has been dissolved.

4. The disk drive of claim 2, wherein the head-movement dissolution detecting unit is configured to detect that the abnormal movement of the head is not detected for more consecutive samples than a preset number while the supply of power to the heating element is stopped, thereby to detect that the abnormal movement of the head has been dissolved.

5. The disk drive of claim 4, wherein head-movement dissolution detecting unit is configured to include:
   a counter which is configured to count consecutive samples for which the abnormal movement of the head is not detected while the supply of power to the heating element remains stopped on the basis of a detection result of the head-movement detecting unit; and
   a sample-number comparing unit which is configured to compare a count value in the counter with the preset number.

6. The disk drive of claim 1, wherein the heating-element controller is configured to stop supplying power to the heating element when a seek-operation is started.

7. The disk drive of claim 1, further comprising a position-error computation unit which is configured to compute a position error of the head during the head positioning control, the position error indicting a deviation of the head from the target position, wherein the head-movement detecting unit is configured to detect the abnormal movement of the head based on the position error computed for a present sample and the position error which has been computed for a previous sample.

8. The disk drive of claim 7, wherein the position-error computation unit is configured to compute the position error from burst data included in each servo data read by the head during the head positioning control.

9. The disk drive of claim 7, wherein the value of the movement of the head is indicated by a difference between the position error pertaining to the previous sample and the position error pertaining to the present sample.

10. The disk drive of claim 9, wherein the head-movement detecting unit is configured to include:
    a subtracting unit which is configured to calculate the difference as the value of the movement of the head; and
    a movement comparing unit which is configured to compare the difference with the preset movement value.

11. A method of adjusting a dynamic flying height of a head having a heating element, which is designed for use in a disk drive, and which adjusts the dynamic flying height of the head by supplying power to the heating element, the method comprising:
    detecting an abnormal movement of the head, a value of which exceeds a preset movement value during a head positioning control performed to settle the head at a target position on a disk; and
    stopping a supply of power to the heating element when the abnormal movement of the head is detected.

12. The method of claim 11, further comprising detecting dissolution of the abnormal movement of the head.

13. The method of claim 12, further comprising starting the supply of power to the heating element again when the dissolution of the abnormal movement of the head is detected.

14. The method of claim 12, wherein the detecting dissolution is configured to include determining that the head remains not moving for more consecutive samples than a preset number while the supply of power to the heating element is stopped, thereby to detect the dissolution of the abnormal movement of the head.

15. The method of claim 14, wherein the determining is configured to include:
    counting consecutive samples for which the abnormal movement of the head is not detected while the supply of power to the heating element remains stopped; and
    comparing a count value in the counting with the preset number.

16. The method of claim 11, further comprising stopping the supply of power to the heating element when a seek operation is started.

17. The method of claim 11, further comprising:
    computing a position error of the head during the head positioning control, the position error indicting a deviation of the head from the target position; and
    computing the value of the movement of the head when the position error for a present sample is computed, from the position error pertaining to a previous sample and the position error pertaining to the present sample.

18. The method of claim 17, wherein the value of the movement of the head is a difference between the position error pertaining to the previous sample and the position error pertaining to the present sample.

* * * * *